Jan. 31, 1961     A. VIAN-ORTUÑO ET AL     2,970,039
PROCESS FOR THE PRODUCTION OF AMMONIUM SULFATE
Filed March 31, 1955
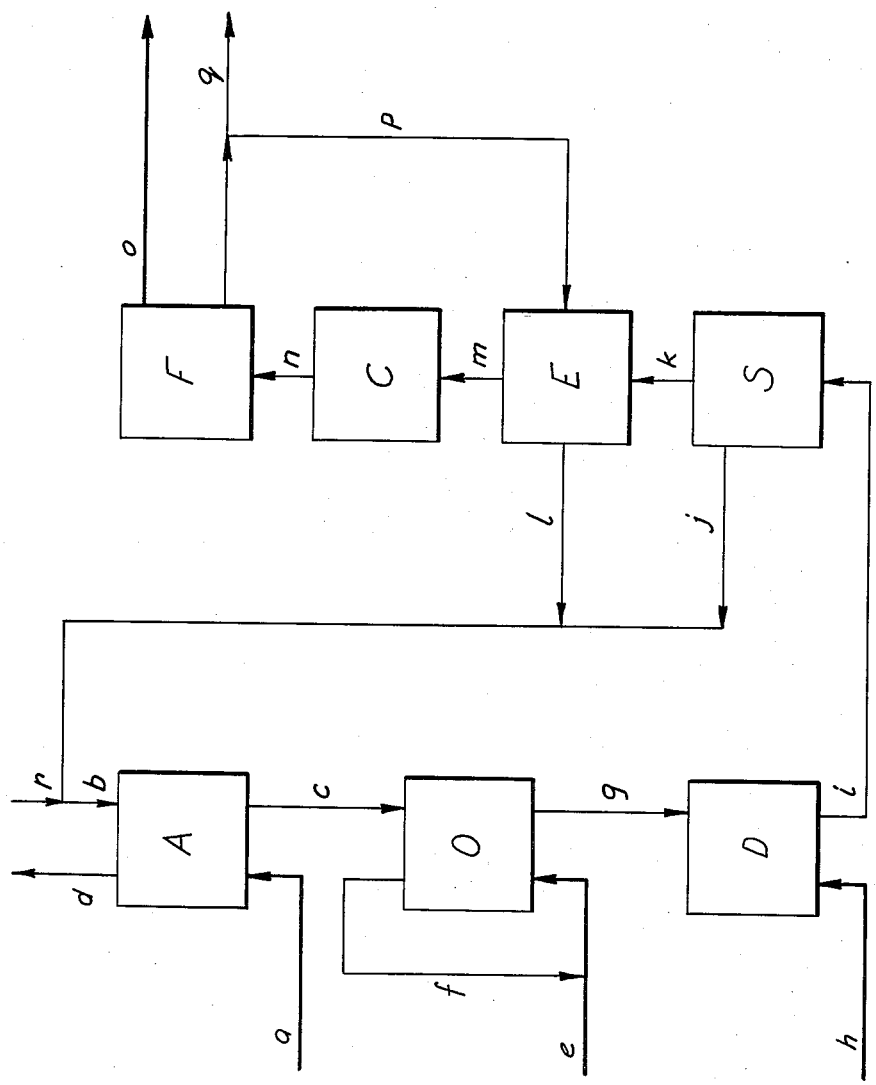

United States Patent Office
2,970,039
Patented Jan. 31, 1961

2,970,039
PROCESS FOR THE PRODUCTION OF AMMONIUM SULFATE

Angel Vian-Ortuño and Alicia Crespí-González, both of Plaza de Salamanca 8, Madrid, Spain Filed Mar. 31, 1955, Ser. No. 498,418

Claims priority, application Spain Apr. 23, 1954

12 Claims. (Cl. 23—119)

To our knowledge there exists no biographic antecedent, nor industrial realization, for the production of ammonium sulfate that is similar to, or in relation with, the process claimed by the present invention.

Numerous methods have been proposed and applied in order to concentrate $SO_2$ by absorption and setting out, among others, from gases containing same, such as roasting gases and residue gases from metallurgical processes. The majority of absorbents utilized to this effect are substances of a basic character that combine with the sulfurous matter, thereby resulting in a labile compound which, when heated, is apt to regenerate the $SO_2$ and the initial base. However, these absorbents present a generalized inconvenience in that upon endeavoring to provoke the desorption of the said gas, this cannot be carried out in a quantitative manner because, in compliance with conditions, smaller or larger amounts of dioxide are retained in the solvent, even by forcing the temperature, the degree of vacuum, or the stirring thereof to exaggerate limits.

A detailed research of this phenomenon has enabled us to discover its general character and constitution. In virtue thereof, seemingly the absorption of the sulfur dioxide is accomplished by forming sulfite of the base constituting the absorbent, or that it can be present therein. This sulfite is labile and can regenerate the $SO_2$ by provoking desorption. However, the fact is that this desorption is not quantitative, as a part of the sulfur with a previous valency of +4 (sulfite) has thus acquired a valency of +6 (sulfate); that is to say, a sulfate, that is stable under the desorption condition, is obtained. This phenomenon naturally, only occurring when the oxygen acts simultaneously or successively on the absorbent.

We have, furthermore, studied such conditions that facilitate this oxidation from sulfite to sulfate (partial pressures of the oxygen, dilution or mixing of absorbents, relative turbulence of the liquid-absorbent and gaseous phases, temperature, catalysts, etc.) having been able to modify and intensify the phenomenon to such an extent, that it can be utilized industrially, especially when the substantially complete transformation of the sulfite constituting the base into sulfate, has been achieved, should said base possess a lesser basicity to that of the ammonia, upon treating this sulfate with ammonia it will entirely transform to a free base—which returns to the absorption cycle—and ammonium sulfate.

According to our process, as will be understood, there is no need for the synthesis of sulfuric acid from the sulfur dioxide so as to obtain the ammonium sulfate. The advantages of our process with regards to the conventional methods will appear obvious, as undoubtedly the installation is more economical and less complicated, while furthermore requiring no expensive catalysts, or such as are relatively difficult to acquire, easily poisoned, and of a limited "life."

In compliance with our process, the sulfurous gases from chemical or metallurgical operations, or such as are obtained by the roasting of sulfides or by the combustion of sulfur, with or without an oxygen content, are obliged to pass, after having been dusted and eventually also purified in a conventional manner, in contact with the absorbent base, wherein the sulfur dioxide is fixed as sulfite (partial as sulfate, should the gases be accompanied by oxygen) Absorption Process.

The sulfite matter is placed in contact with oxygen (or such gases as contain same) at an appropriate temperature, thus resulting in sulfate Oxidation Process.

The sulfate is treated with ammonia, thereby forming ammonium sulfate, which constitutes a separate phase to that of the base. This is then reintegrated to the absorption cycle and the ammonium sulfate is beneficiated by the usual process Decomposition Process.

Due to the fact that some of the bases form sulfite or solid sulfate, it is therefore that in such cases it is advisable not to operate during the absorption or oxidation processes with the base alone, but with a mixture of this latter and another liquid, so as to avoid a crystallization of these substances. This crystallization can also be avoided by not allowing the absorption of $SO_2$ to attain great limits. From an industrial point of view, the most interesting "solvent" is water, which in determined proportions, and by the combined action of the $SO_2$, can be mixed with the base representing one only phase, so that obstructions are avoided and the opertion can be preformed in a continuous manner. It is advisable to accomplish absorption at the lowest possible temperatures, as is generally prescribed for all absorption processes, although this temperature will determine the solubility of the solid products during the absorption phase, which on the other hand, will increase with the temperature.

The oxidation process can be accelerated by utilizing catalysts, whose fundamental condition, apart from their catalytic action, resides in that they should be compatible with the nature of the system. In our case, we have achieved satisfactory results with copper, manganese and cobalt salts, for example. The proportion in which these should be utilized, as will be understood, varies with the nature of the absorbent. The most simple means to ensure their cyclical operation consists in dissolving them in the liquid absorbent. Oxidation is likewise facilitated by an increase of temperature, pressure and turbulence between the oxidizing gases and the sulfite liquid. The most favorable conditions of these actions cannot be determined "a priori" in a generalized manner, as the convenience of their application depends upon the cost price and the disposability of the power required for the production thereof; their action is positive during the process, whereas the cost price for this action may not always appear advisable.

With regards to the decomposition process, ammonia can be utilized either as a gas or in an aqueous solution. Should very intense dilution with water be required for the absorbent (due to the facility of forming solid products during the absorption or oxidation stages, in virtue of the nature of the base being utilized), it would then be advisable to utilize ammoniacal gas, thus saving the expenses for the concentration of the aqueous solution of ammonium sulfate that is thereby obtained. Should the absorbent contain a low percentage of water, then a predetermined concentration of aqueous ammonia can be utilized, so that the ammonium sulfate will leave the decomposition process at the approximate saturation concentration, or supersaturated—with ammonium sulfate crystals—should the installation of an auxiliary plant for the removal of all traces of the absorbent base from said crystals, be desired, which in many cases can be retained. The mother liquors from the crystallization stage can be returned to the absortpion cycle, when containing a catalyst, which always occurs when these are soluble in water; however, it may be considered advisable to recover the catalyst separately and not to recirculate the mother liquors, so as to avoid the accumulation of impurities.

The essential condition of the absorbent resides in that it should be of a basic character with a basicity inferior to that of the ammonia. This condition is substantial for our present process. Many products possess this condition, as for example the heterocyclic aromatic, aliphatic, cycloparaffinic or cycloolefinic amines, either simple or substituted by hydrocarbon or polar groups, which modify their basicity, solubility, absorbent character or melting and boiling point. In short, the only existing difference between the one and the others, resides in the profitableness of their regeneration (losses through degradation or volatilization) which, however, cannot be considered of a limiting character for our present process. Exclusively, by way of a non limiting example, we should here cite the cyclohexylanilin, the toluidines, the quinoline, the pyridine bases of tar (heavy pyridines), the pyridine, the lutidines, the ethanol amines, the diphenyl amine, etc., and/or their derivatives.

Due to the fact that these bases can possess a higher basicity to that required during the reversible absorption process, as a reversibility of the absorption is not required, it is therefore that very strong bases can be utilized (almost up to the basicity of the ammonia) and thus gases containing $SO_2$ can be recovered in a very small concentration.

The manner in which the ammonium sulfate is obtained depends upon the solubility of the this salt in the free base and upon the solvent which, eventually, can be utilized as well as upon the solubility or miscibility of the absorbent with the solvent. Under the most favorable circumstances, the absorbent and solvent are both insoluble, as in this case ammonium sulfate remains in the aqueous phase and thus only a simple decantation is needed in order to separate the absorbent and the solvent from the ammonium sulfate. The case is even more favorable when, besides the aforementioned, the presence of $SO_2$ in the absorbent-solvent system provokes the complete miscibility of these two agents. This is achieved with quinoline and water, that are miscible under the absorption conditions (by the presence of $SO_2$) and immiscible under decomposition conditions (aqueous quinoline-solution of ammonium sulfate).

Likewise, and exclusively by way of a non limiting example, the diagram shown in the accompanying drawing discloses a detailed performance of an installation wherein quinoline mixed with water is utilized as an absorbent, although, as has already been stated, the quinoline can be replaced by any other absorbent and the water by any other solvent, by means of an adjustment of the working conditions to the specific characteristics of the new system.

The capital letters used in this diagram indicate the apparatus utilized for the divers operations, and therein: A=the $SO_2$ absorption apparatus; O=the oxidation apparatus; D=the quinoline sulfate decomposition apparatus; S=the separator; E=the evaporation system; C=the crystallizer; F=the filter, washer and desiccator apparatus.

The diluted gases containing $SO_2$ (100 kgs.) enter at $a$ in A, where they are placed in contact with the quinoline-water mixture (981 kgs.) at about 30°, thereby homogenizing the absorbent when the $SO_2$ concentration attains about 5.5 parts percent of absorbent. The residue gases leave at $d$, deprived of $SO_2$ and at $c$ the absorbent with an $SO_2$ content of 10.5/100. This $SO_2$ concentration, which depends upon the absorption temperature, as also upon the $SO_2$ concentration in the gases, can reach a 25/100; however, in practice this will be limited by the viscosity and the formation of solid products in the absorbent.

The absorbent enriched with $SO_2$ at $c$ penetrates in O and is therein oxidized with oxygen (25 kgs.) that is introduced at $e$, by effecting the necessary recirculation at $f$. Oxidation is accelerated by working with temperatures of about 50–80°. The quinoline sulfate dissolved in water leaves at $g$, passing on to D, where by means of gaseous $NH_3$ (53 kgs.), that enter at $h$, the quinoline is liberated, the mixture passing on in two phases (aqueous quinoline-solution of ammonium sulfate) to S at $i$, where a separation of both phases takes place. The quinoline leaves at $j$ to return to A, whereas the ammonium sulfate solution passes at $k$ to E, where the solution is concentrated, which exceeds from 75.4 to 106 parts of salt per 100 of water. The steam (275 kgs.) leaves at $l$ and is again introduced at $b$ in A, after having passed through a heat exchanger, and at $m$ the concentrated solution of ammonium sulfate (715 kgs. of ammonium sulfate and 647 kgs. of water) is extracted to enter in C, where a partial crystallization of the ammonium sulfate is carried out. The mixture at $n$ passes on to F, where the ammonium sulfate crystals (206 kgs.) are filtered, washed and desiccated, and then leaves the system at O. The majority of the mother liquors are again introduced at $p$ in E, extracting at $q$ a small quantity for the recovery of the catalyst and the removal of impurities. The liquor drawn from the system at $q$, besides such that is combined to form ammonium sulfate, has to be replaced by introducing same at $r$ in A, prior to adding thereto copper sulfate (oxidation catalyst) in proportions of 0.01 to 1 part for each 100 of absorbent (quinoline+water).

It should here be stressed that the present process will admit numerous modifications without departing from the essence thereof, and which are in compliance with the relative solubilities of the base, the solvent, the ammonium sulfate and the water (this has to be taken into consideration when the solvent is water, or should gaseous ammonia be utilized instead of aqueous ammonia for the decomposition process). The separation of phases, the interaction thereof, the regulation of rates of flow and all the operations and measures required for the performance of an installation, in accordance with our new process, in any of the said possible modifications thereof, can be carried out by any of the methods known in chemical engineering. Furthermore, and as such are not deemed substantial for the comprehension of the present invention, no reference has been made herein to the systems that from an industrial point of view should be included in the plant in order to obtain the maximum calorific yield, the recovery of catalysts, etc. etc.

Having now particularly described and ascertained the nature and essence of the present invention and in what manner the same is to be performed, it should be stressed that the aforementioned embodiments admit modifications in detail, provided they do not alter the fundamental principle which is such as is disclosed heretofore and defined in the appended claims.

What we claim is:

1. A process of producing ammonium sulfate from sulfur dioxide-containing gas, comprising the steps of passing sulfur dioxide-containing gas through a liquid organic base weaker than ammonia, thereby binding said sulfur dioxide to said organic base; adding oxygen to the thus-formed sulfite of said organic base so as to substantially completely oxidize the same to the sulfate of said organic base without retaining any appreciable quantity of said sulfite of said organic base; treating said sulfate of said organic base with ammonia, thereby freeing said base and forming ammonium sulfate; and recovering the thus-formed ammonium sulfate.

2. A process of producing ammonium sulfate from sulfur dioxide-containing gas, comprising the steps of passing sulfur dioxide-containing gas through a liquid organic base weaker than ammonia and belonging to the group consisting of simple, hydrocarbon-substituted, and polar groups-substituted aliphatic, cycloparaffinic, cycloolefinic and heterocyclic aromatic amines, thereby binding said sulfur dioxide to said organic base; adding oxygen to the thus-formed sulfite of said organic base so as to substantially completely oxidize the same to the sulfate of said organic base without retaining any appreciable quantity of said sulfite of said organic base; treating said sulfate of said organic base with ammonia, thereby freeing said base and forming ammonium sulfate; and recovering the thus-formed ammonium sulfate.

3. A process of producing ammonium sulfate from sulfur dioxide-containing gas, comprising the steps of passing sulfur dioxide-containing gas through a mixture of water and a liquid organic base in which ammonium sulfate is insoluble and weaker than ammonia, thereby binding said sulfur dioxide to said base; treating said bound sulfur dioxide with a quantity of oxygen sufficient to substantially completely oxidize said bound sulfur dioxide so as to form the sulfate of said organic base without retaining any appreciable quantity of sulfur dioxide; treating said sulfate of said organic base with ammonia thereby freeing said base and forming ammonium sulfate; and recovering the thus-formed ammonium sulfate.

4. A process of producing ammonium sulfate from sulfur dioxide-containing gas, comprising the steps of passing sulfur dioxide-containing gas through a mixture of a solvent for ammonium sulfate and a liquid organic base in which ammonium sulfate is insoluble and weaker than ammonia, thereby binding said sulfur dioxide to said base; treating said bound sulfur dioxide in said mixture with a quantity of oxygen sufficient to substantially completely oxidize said bound sulfur dioxide so as to form the sulfate of said organic base; treating said sulfate of said organic base with ammonia, thereby freeing said base and forming ammonium sulfate; and recovering the thus-formed ammonium sulfate.

5. A process of producing ammonium sulfate from sulfur dioxide-containing gas, comprising the steps of passing sulfur dioxide-containing gas through a liquid organic base weaker than ammonia, thereby binding said sulfur dioxide to said base; adding an oxidation catalyst and oxygen to the thus-formed sulfite of said organic base so as to substantially completely oxidize the same to the sulfate of said organic base without retaining any appreciable quantity of said sulfite of said organic base; treating said sulfate of said organic base with ammonia, thereby freeing said base and forming ammonium sulfate; and recovering the thus-formed ammonium sulfate.

6. A process of producing ammonium sulfate from sulfur dioxide-containing gas, comprising the steps of passing sulfur dioxide-containing gas through a mixture of water and a liquid organic base in which ammonium sulfate is insoluble and weaker than ammonia, thereby binding said sulfur dioxide to said base; treating said bound sulfur dioxide in said mixture with a quantity of oxygen sufficient to substantially completely oxidize said bound sulfur dioxide so as to form the sulfate of said organic base; treating said sulfate of said organic base with ammonia, thereby freeing said base and forming an aqueous solution of ammonium sulfate; and separating the thus-formed aqueous solution of ammonium sulfate from said base.

7. A process of producing ammonium sulfate from sulfur dioxide-containing gas, comprising the steps of passing sulfur dioxide-containing gas through a liquid organic base weaker than ammonia, thereby binding said sulfur dioxide to said base; simultaneously adding oxygen to the thus-formed sulfite of said organic base so as to substantially completely oxidize the same to the sulfate of said organic base without retaining any appreciable quantity of said sulfite of said organic base; treating said sulfate of said organic base with ammonia, thereby freeing said base and forming ammonium sulfate; and recovering the thus-formed ammonium sulfate.

8. A process of producing ammonium sulfate from sulfur dioxide-containing gas, comprising the steps of passing sulfur dioxide-containing gas through quinoline, thereby binding said sulfur dioxide to said quinoline; adding an oxidation catalyst and oxygen in a quantity sufficient to oxidize substantially all of said bound sulfur dioxide so as to form quinoline sulfate and without retaining any appreciable quantity of said sulfur dioxide; treating said quinoline sulfate with ammonia thereby freeing said quinoline and forming ammonium sulfate; and recovering the thus-formed ammonium sulfate.

9. A process of producing ammonium sulfate from sulfur dioxide-containing gas, comprising the steps of passing sulfur dioxide-containing gas through a mixture of water and quinoline, thereby binding said sulfur dioxide to said quinoline; adding an oxidation catalyst and oxygen in a quantity sufficient to oxidize substantially all of said bound sulfur dioxide so as to form quinoline sulfate; treating said quinoline sulfate with ammonia, thereby freeing said quinoline and forming an aqueous solution of ammonia sulfate; and separating the thus-formed aqueous solution of ammonia sulfate from said quinoline.

10. A process of producing ammonium sulfate from sulfur dioxide-containing gas, comprising the steps of passing sulfur dioxide-containing gas through quinoline, thereby binding said sulfur dioxide to said quinoline; adding an oxidation catalyst and oxygen in a quantity sufficient to oxidize substantially all of said bound sulfur dioxide so as to form quinoline sulfate and without retaining any appreciable quantity of said quinoline-bound sulfur dioxide; treating said quinoline sulfate with aqueous ammonia, thereby freeing said quinoline and forming an aqueous solution of ammonium sulfate; and separating the thus-formed aqueous solution of ammonium sulfate from said quinoline.

11. A process of producing ammonium sulfate from sulfur dioxide-containing gas, comprising the steps of passing sulfur dioxide-containing gas through an organic base and a solvent therefor, said base being weaker than ammonia, thereby binding said sulfur dioxide to said organic base; adding oxygen to the thus-formed sulfite of said organic base so as to substantially completely oxidize the same to the sulfate of said organic base without retaining any appreciable quantity of said sulfite of said organic base; treating said sulfate of said organic base with ammonia, thereby freeing said base and forming ammonium sulfate; and recovering the thus-formed ammonium sulfate.

12. A process of producing ammonium sulfate from sulfur dioxide-containing gas, comprising the steps of passing sulfur dioxide-containing gas through a liquid organic base weaker than ammonia, thereby binding said sulfur dioxide to said organic base; adding oxygen to the thus-formed sulfite of said organic base so as to substantially completely oxidize the same to the sulfate of said organic base without retaining any appreciable quantity of said sulfite of said organic base; reacting said sulfate of said organic base with ammonia in the presence of water so as to form ammonium sulfate; and recovering the thus-formed ammonium sulfate.

References Cited in the file of this patent

UNITED STATES PATENTS

| | | |
|---|---|---|
| Re. 18,958 | Bottoms | Sept. 26, 1933 |
| 1,934,573 | Peski | Nov. 7, 1933 |
| 2,128,027 | Clark | Aug. 23, 1938 |

FOREIGN PATENTS

| | | |
|---|---|---|
| 435,116 | Great Britain | Sept. 16, 1935 |